US010877508B2

(12) United States Patent
Miyazaki

(10) Patent No.: US 10,877,508 B2
(45) Date of Patent: Dec. 29, 2020

(54) ROBOT INCLUDING STOPPER

(71) Applicant: FANUC CORPORATION, Yamanashi (JP)

(72) Inventor: Genki Miyazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/180,397

(22) Filed: Nov. 5, 2018

(65) Prior Publication Data

US 2019/0171247 A1 Jun. 6, 2019

(30) Foreign Application Priority Data

Dec. 1, 2017 (JP) ................................. 2017-231912

(51) Int. Cl.
*G05G 5/00* (2006.01)
*G05G 5/04* (2006.01)
*B25J 9/10* (2006.01)
*B25J 17/00* (2006.01)

(52) U.S. Cl.
CPC ................ *G05G 5/04* (2013.01); *B25J 9/101* (2013.01); *B25J 17/00* (2013.01)

(58) Field of Classification Search
CPC .............. G05G 5/04; B25J 9/101; B25J 17/00
See application file for complete search history.

(56) References Cited

U.S. PATENT DOCUMENTS

| 7,530,287 B2 * | 5/2009 | Ogura | B25J 9/1005 |
| | | | 414/744.3 |
| 2006/0224275 A1 | 10/2006 | Heldesjo et al. | |
| 2007/0089963 A1 * | 4/2007 | Kinoshita | B25J 9/101 |
| | | | 192/125 A |
| 2012/0041348 A1 * | 2/2012 | Maekita | A61F 5/0102 |
| | | | 601/34 |
| 2014/0033853 A1 * | 2/2014 | Kitahara | B25J 9/042 |
| | | | 74/490.05 |
| 2014/0060235 A1 * | 3/2014 | Ootani | B25J 19/00 |
| | | | 74/490.05 |
| 2014/0331807 A1 * | 11/2014 | Kitahara | B25J 9/042 |
| | | | 74/490.03 |

(Continued)

FOREIGN PATENT DOCUMENTS

| JP | S6052273 A | 3/1985 |
| JP | H2-122792 U | 10/1990 |
| JP | H4-13285 U | 2/1992 |

(Continued)

*Primary Examiner* — Zakaria Elahmadi
(74) *Attorney, Agent, or Firm* — Hauptman Ham, LLP

(57) ABSTRACT

A robot that enables a stopper to be installed even when it is difficult to allow a space for providing the stopper. The robot includes a first component; a second component movably coupled to the first component; a first stopper provided on one of the first component and the second component, the first stopper extending along an axis parallel to a movement direction of the second component relative to the first component; and a second stopper provided on the other of the first component and the second component, the second stopper configured to come into contact with the first stopper when the second component moves relative to the first component and limit a movement range of the second component relative to the first component.

3 Claims, 18 Drawing Sheets

(56) References Cited

U.S. PATENT DOCUMENTS

| | | | |
|---|---|---|---|
| 2015/0081096 A1* | 3/2015 | Shiraki | B25J 9/101 700/255 |
| 2016/0101528 A1* | 4/2016 | Inoue | B25J 9/101 74/490.04 |

FOREIGN PATENT DOCUMENTS

| | | | | |
|---|---|---|---|---|
| JP | H6-79660 A | | 3/1994 | |
| JP | 10202574 A | * | 8/1998 | B25J 9/101 |
| JP | H10-202574 A | | 8/1998 | |
| JP | H11-123690 A | | 5/1999 | |
| JP | 2006-187815 A | | 7/2006 | |
| JP | 2015163414 A | | 9/2015 | |

* cited by examiner

ROBOT INCLUDING STOPPER

RELATED APPLICATIONS

The present application claims priority of Japanese Patent Application No. 2017-231912, filed on Dec. 1, 2017, the disclosure of which is hereby incorporated by reference herein in its entirety.

BACKGROUND OF THE INVENTION

1. Field of the Invention

The invention relates to a robot including a stopper configured to limit a movement range of a movable component.

2. Description of the Related Art

There are known robots including a stopper for limiting a movement range of a movable component (e.g., a robotic arm) of the robot (e.g., Japanese Unexamined Patent Publication (Kokai) No. H10-202574).

Conventionally, to limit a movement range of a movable component of a robot using a stopper, as described in PTL 1, a plurality of stoppers are provided at a plurality of positions in the robot. In this case, a space for installing the stopper is preferably secured, and in case of a robot for which securing such a space is difficult, there has been a case where installing the stopper may be hardly achievable due to limitations of space.

SUMMARY OF THE INVENTION

In an aspect of the disclosure, a robot includes a first component; a second component movably coupled to the first component; a first stopper provided at one of the first component and the second component, and extending along an axis parallel to a movement direction of the second component relative to the first component; and a second stopper provided at the other of the first component and the second component, and configured to contact the first stopper so as to limit a movement range of the second component relative to the first component when the second component moves relative to the first component.

According to the disclosure, without arranging a plurality of physical stoppers along the moving trajectory of the movable component, it is possible to limit the movement range of the movable component as desired. Thus, even when it is difficult to allow a space for installing the stoppers, the movement range of the movable component can be set as desired.

DETAILED DESCRIPTION

Figure 1:
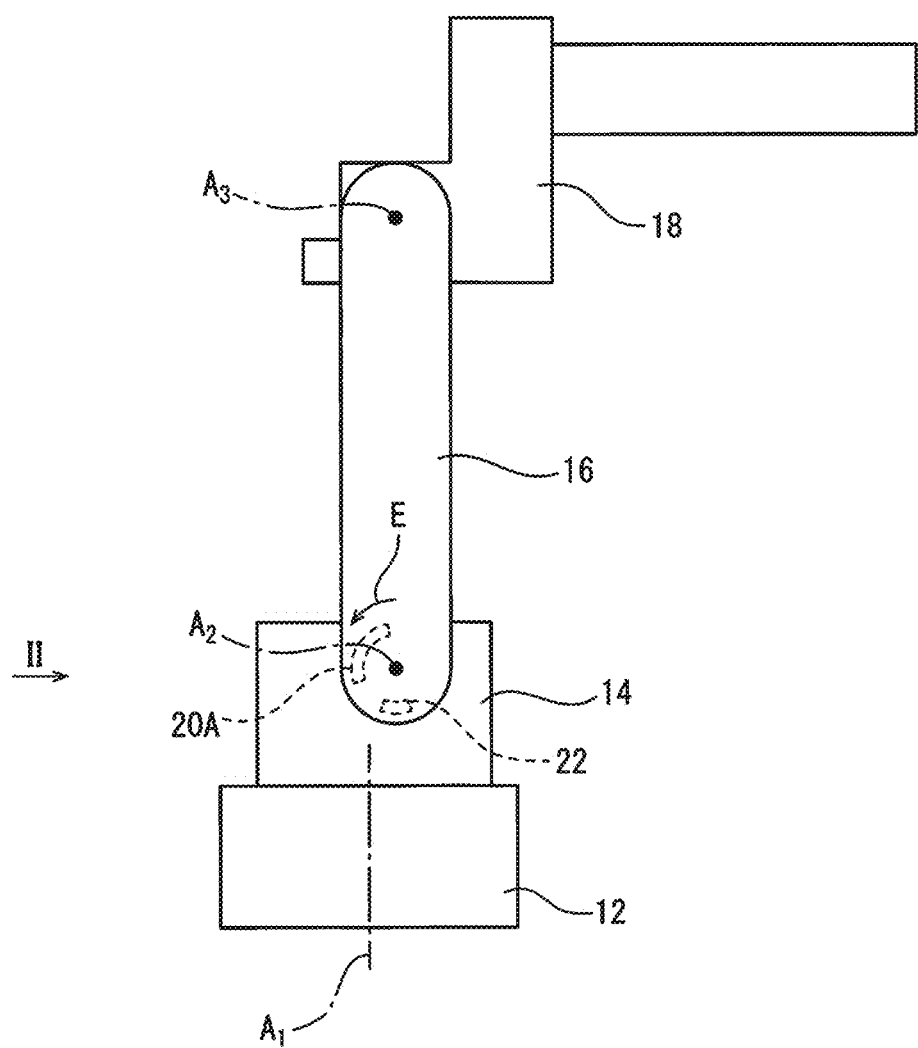
FIG. 1 is a diagram of a robot according to an embodiment.

Embodiments of the disclosure will be described below in detail on the basis of the drawings. Note that, in various embodiments described below, similar elements are assigned the same reference numerals, and redundant descriptions thereof will be omitted. First, referring to FIG. 1 to FIG. 5, a robot 10 according to an embodiment will be described.

As illustrated in FIG. 1, a robot 10 is a vertical articulated robot, and includes a base 12, a rotating body 14, a lower arm 16, an upper arm 18, a first stopper 20A, and a second stopper 22.

The base 12 is fixed on a floor of a work cell. The rotating body 14 is coupled to the base 12 so as to be rotatable about a first axis $A_1$. In this embodiment, the first axis $A_1$ is parallel to the vertical direction.

The lower arm 16 is coupled to the rotating body 14 so as to be rotatable about a second axis $A_2$. The second axis $A_2$ is perpendicular to the first axis $A_1$, and rotates about the first axis $A_1$.

The upper arm 18 is coupled to the lower arm 16 so as to be rotatable about a third axis $A_3$. The third axis $A_3$ is parallel to the second axis $A_2$, and rotates about the first axis $A_1$ and the second axis $A_2$.

The robot 10 includes a plurality of servomotors (not illustrated) built in the base 12, the rotating body 14, and the lower arm 16. These servomotors rotate the rotating body 14, the lower arm 16, and the upper arm 18.

Figure 2:
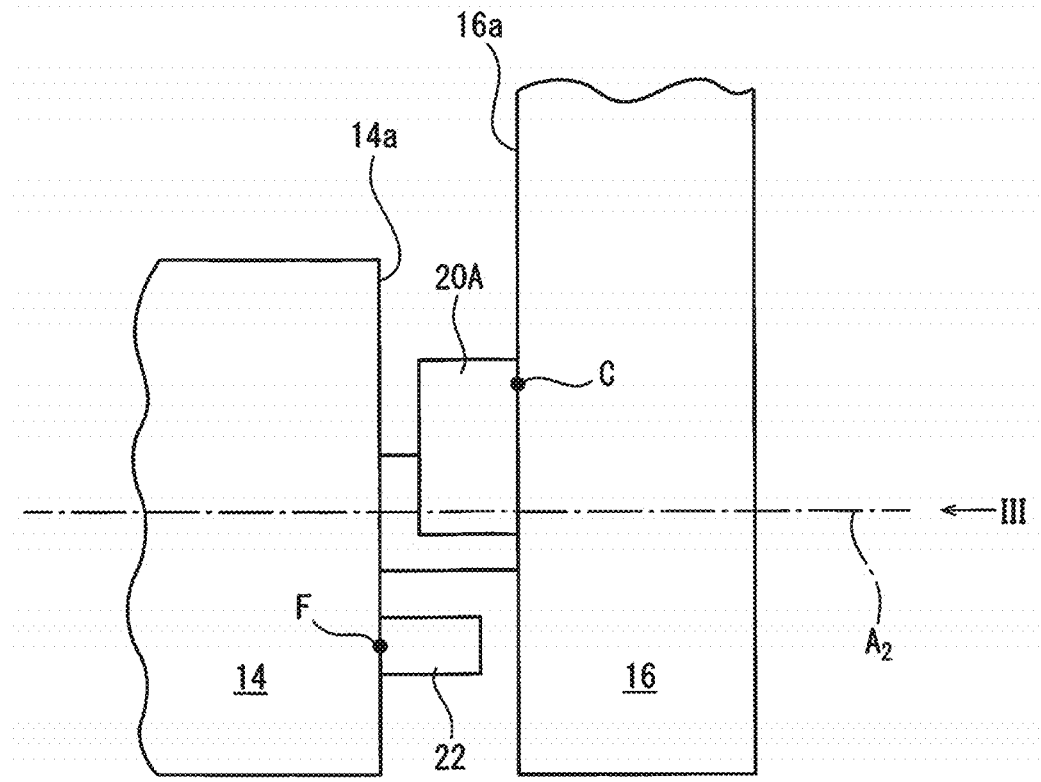
FIG. 2 is a diagram of a coupled portion of a rotating body and a lower arm illustrated in FIG. 1, as viewed in a direction of an arrow II in FIG. 1.

As illustrated in FIG. 2, in this embodiment, the first stopper 20A is detachably attached to a side surface 16a of the lower arm 16, while the second stopper 22 is detachably attached to a side surface 14a of the rotating body 14. The side surface 16a of the lower arm 16 and the side surface 14a of the rotating body 14 face each other.

The first stopper 20A is detachably attached to the side surface 16a of the lower arm 16 at a position C on the side surface 16a by a fastener such as a bolt or by a snap fit for example. When the first stopper 20A is attached to the side surface 16a, the first stopper 20A is fixed immovably relative to the side surface 16a.

Figure 3:
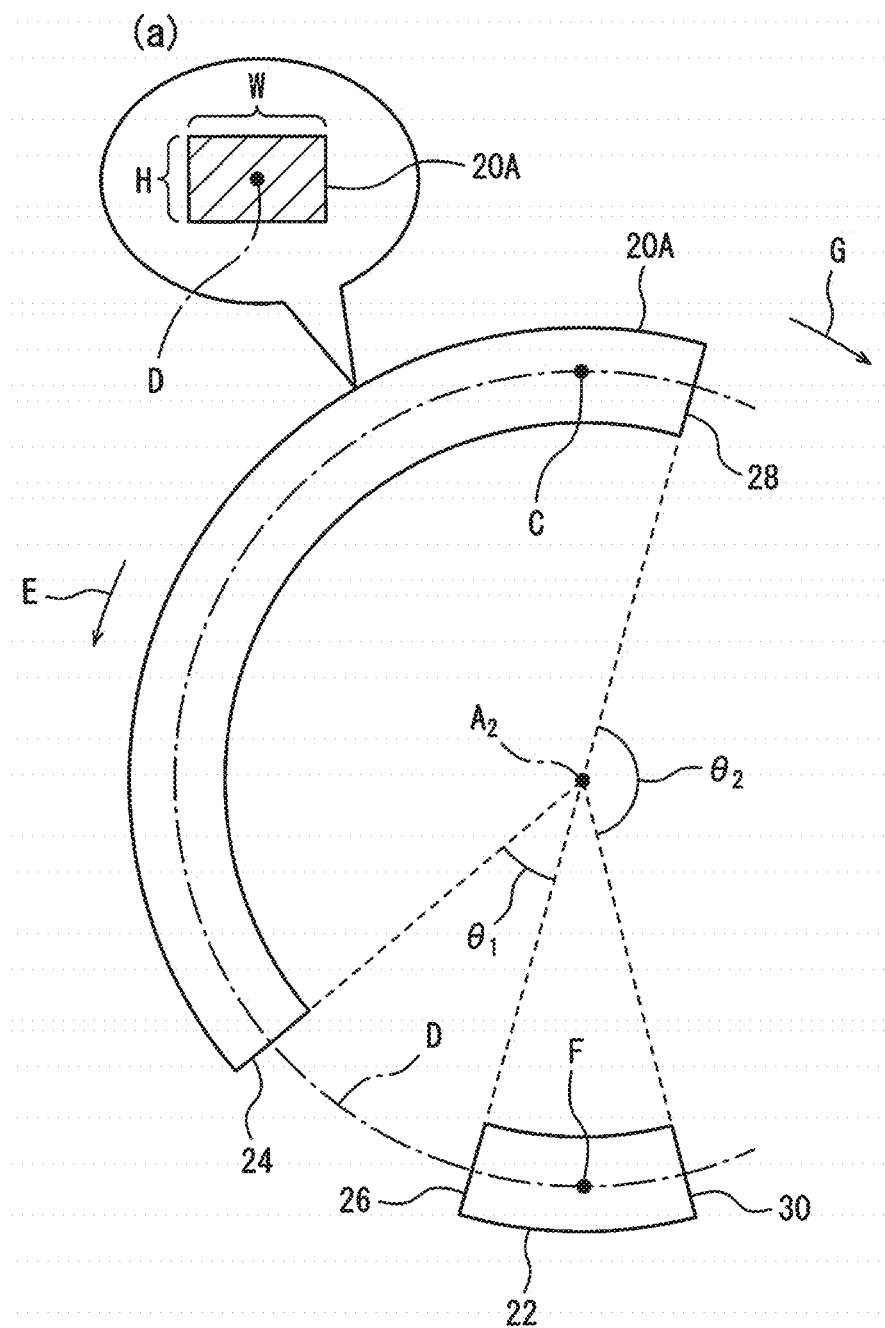
FIG. 3 is a diagram of a first stopper and a second stopper illustrated in FIG. 2, as viewed in a direction of an arrow III in FIG. 2, and illustrates only the first stopper and the second stopper to facilitate understanding.

As illustrated in FIG. 3, the first stopper 20A extends from the position C toward the second stopper 22 along an axis D. The axis D passes the position C and is parallel to movement directions E and G of the lower arm 16 relative to the rotating body 14. The axis D coincides with a circle centered about the axis $A_2$.

As illustrated in section (a) in FIG. 3, the first stopper 20A has a substantially quadrangular cross-section having a height H and width W. The first stopper 20A extends in an arc-like fashion so as to have a longitudinal direction in the direction of the axis D. Note that, "to have a longitudinal direction in the direction of the axis D" means that the length in the extension direction of the first stopper 20A along the axis D is greater than the height H and the width W of the first stopper 20A.

The second stopper 22 is detachably attached to the side surface 14a of the rotating body 14 at a position F on the side surface 14a by a fastener such as a bolt or by a snap fit for example. When the second stopper 22 is attached to the side surface 14a, the second stopper 22 is fixed immovably relative to the side surface 14a.

The second stopper 22 is disposed on the axis D. The second stopper 22 has the same cross-section as the first stopper 20A, and extends along the axis D in an arc-like fashion so as to have a longitudinal direction in the direction of the axis D.

When the lower arm 16 is rotated in the direction E relative to the rotating body 14 from the position illustrated in FIG. 1 and FIG. 3, the first stopper 20A provided at the lower arm 16 is also rotated in the direction E along the axis D, together with the rotation of the lower arm 16.

When the lower arm 16 rotates relative to the rotating body 14 in the direction E by an angle $\theta_1$ in FIG. 3, an end face 24 of the first stopper 20A contacts an end face 26 of the second stopper 22 provided at the rotating body 14. Consequently, the further rotational movement of the lower arm 16 relative to the rotating body 14 in the direction E is restricted.

On the other hand, when the lower arm 16 rotates relative to the rotating body 14 from the position illustrated in FIG. 1 and FIG. 3 in the direction G opposite the direction E by an angle $\theta_2$ in FIG. 3, an end face 28 of the first stopper 20A contacts an end face 30 of the second stopper 22 provided at the rotating body 14.

Consequently, the further rotational movement of the lower arm 16 relative to the rotating body 14 in the direction G is restricted. In this manner, by the first stopper 20A and the second stopper 22, the movement range of the lower arm 16 relative to the rotating body 14 is limited within a range of the angle $\theta_1$ in the direction E and the angle $\theta_2$ in the direction G with reference to the position in FIG. 3.

Figure 4:
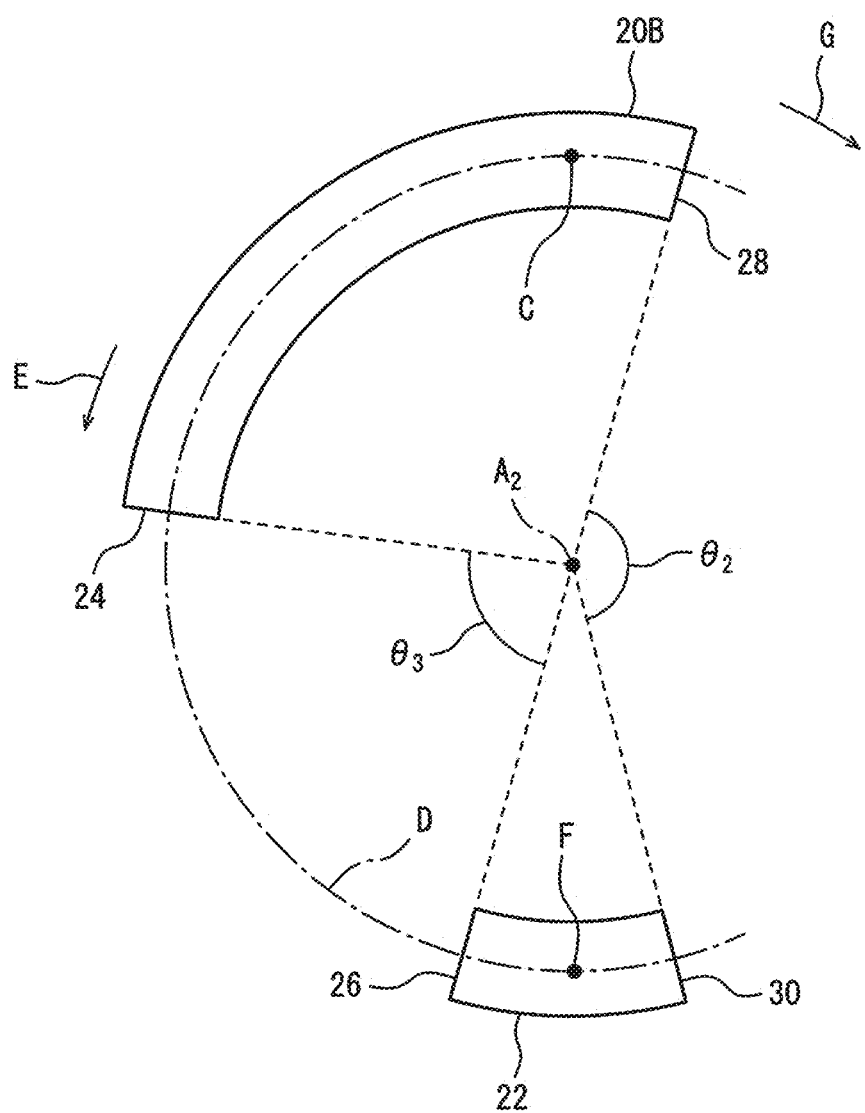
FIG. 4 is a diagram equivalent to FIG. 3, illustrating a positional relationship, when a different first stopper is installed, between the different first stopper and the second stopper.
Figure 5:
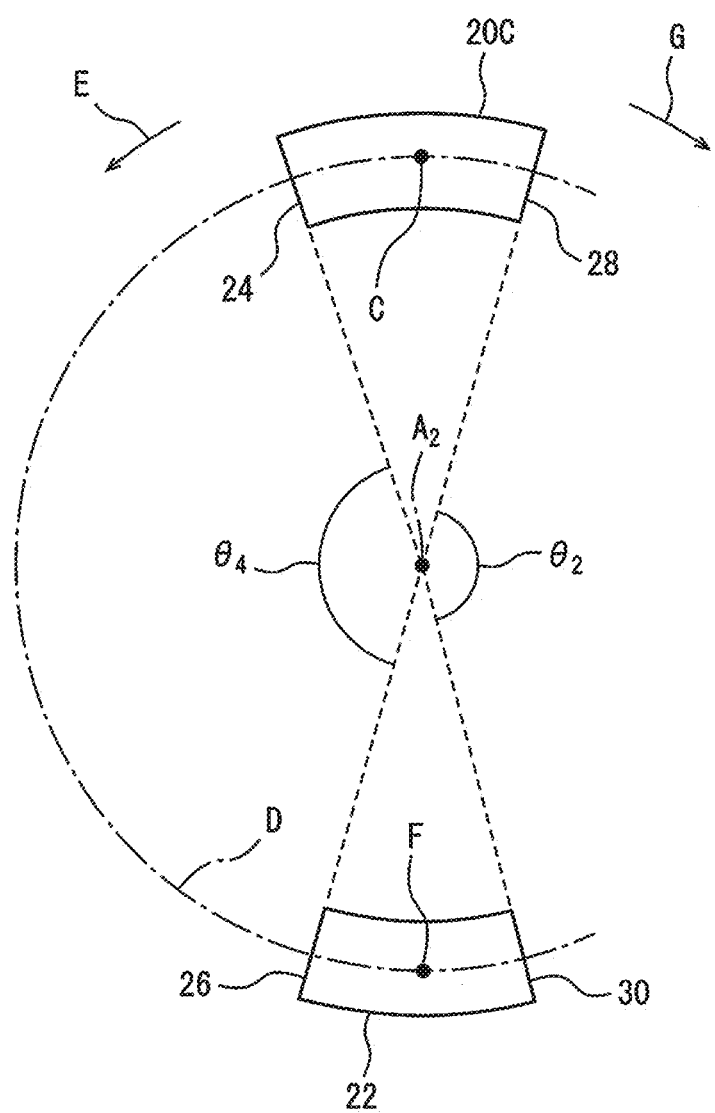
FIG. 5 is a diagram equivalent to FIG. 3, illustrating a positional relationship, when a still different first stopper is installed, between the still different first stopper and the second stopper.

In this embodiment, the robot 10 further includes a first stopper 20B illustrated in FIG. 4, and a first stopper 20C illustrated in FIG. 5. These first stoppers 20B and 20C can be detachably attached to the side surface 16a of the lower arm 16 at the position C on the side surface 16a, in place of the aforementioned first stopper 20A, e.g. by a fastener such as a bolt or by a snap fit.

The first stopper 20B illustrated in FIG. 4 has the same cross-section as the first stopper 20A, and extends along the axis D in an arc-like fashion so as to have a longitudinal direction in the direction of the axis D. The length of the first stopper 20B in the direction of the axis D is shorter than that of the first stopper 20A.

More specifically, the length in the direction of the axis D of the first stopper 20B from the position C to the end face 24 is shorter than that of the first stopper 20A. When the first stopper 20B is attached to the side surface 16a of the lower arm 16, the first stopper 20B is fixed immovably relative to the side surface 16a.

When the lower arm 16 is rotated in the direction E relative to the rotating body 14 from the position illustrated in FIG. 4 in a state where the first stopper 20B is attached to the lower arm 16, the first stopper 20B is also rotated in the direction E along the axis D, together with the rotation of the lower arm 16.

When the lower arm 16 rotates relative to the rotating body 14 in the direction E by an angle $\theta_3 (>\theta_1)$ in FIG. 4, the end face 24 of the first stopper 20B contacts the end face 26 of the second stopper 22 provided at the rotating body 14. Consequently, the further rotational movement of the lower arm 16 relative to the rotating body 14 in the direction E is restricted.

In this manner, by the first stopper 20B and the second stopper 22, the movement range of the lower arm 16 relative to the rotating body 14 is limited within a range of the angle $\theta_3$ in the direction E and the angle $\theta_2$ in the direction G with reference to the position in FIG. 4.

The first stopper 20C illustrated in FIG. 5 has the same cross-section as the first stopper 20A, and extends in an arc-like fashion along the axis D so as to have a longitudinal direction in the direction of the axis D. The length of the first stopper 20C in the direction of the axis D is shorter than that of the aforementioned first stopper 20B. More specifically, the length of the first stopper 20C from the position C to the end face 24 in the direction of the axis D is shorter than that of the first stopper 20B.

When the first stopper 20C is attached to the side surface 16a of the lower arm 16, the first stopper 20C is fixed immovably relative to the side surface 16a. When the lower arm 16 is rotated in the direction E relative to the rotating body 14 from the position illustrated in FIG. 5 in a state where the first stopper 20C is attached to the lower arm 16, the first stopper 20C is also rotated along the axis D in the direction E, together with the rotation of the lower arm 16.

When the lower arm 16 rotates relative to the rotating body 14 in the direction E by an angle $\theta_4 (>\theta_3)$ in FIG. 4, the end face 24 of the first stopper 20C contacts the end face 26 of the second stopper 22 provided at the rotating body 14. Consequently, the further rotational movement of the lower arm 16 relative to the rotating body 14 in the direction E is restricted.

In this manner, by the first stopper 20C and the second stopper 22, the movement range of the lower arm 16 relative to the rotating body 14 is limited within a range of the angle $\theta_4$ in the direction E and the angle $\theta_3$ in the direction G with reference to the position in FIG. 5.

As described above, this embodiment includes a plurality of the first stoppers 20A, 20B, and 20C which have the lengths in the direction of the axis D different from each other and which are detachably attached to the lower arm 16. Thus, the user can change the movement range of the lower arm 16 relative to the rotating body 14 in three levels, by selecting and attaching the first stopper 20A, 20B or 20C to the lower arm 16 depending on an application.

In addition, in this embodiment, the first stoppers 20A, 20B, and 20C are configured to extend along the axis D. In other words, the first stoppers 20A, 20B, and 20C extend along a trajectory of the position C when the lower arm 16 moves relative to the rotating body 14.

According to this configuration, it is possible to limit the movement, range of the lower arm 16 relative to the rotating body 14 as desired by setting the length of the first stopper 20A, 20B, or 20C in the direction of the axis D, without arranging a plurality of physical stoppers along the axis D.

Due to this, the movement range of the lower arm 16 can be set as desired by a single first, stopper 20A, 20B, or 20C, even when it is difficult to allow a space for arranging a plurality of stoppers, as in a small or medium-sized robot, for example.

Note that, the first stopper 20A, 20B, or 20C may be replaced with the second stopper 22. Specifically, the first stopper 20A, 20B, or 20C may be attached to the side surface 14a of the rotating body 14 at the position F on the side surface 14a, while the second stopper 22 may be attached to the side surface 16a of the lower arm 16 at the position C on the side surface 16a.

Furthermore, in the embodiment illustrated in FIG. 1 to FIG. 5, the first stoppers 20A, 20B, and 20C are provided so as to extend from the position C in the direction E. However, the first stoppers 20A, 20B, and 200 may be provided so as to extend from the position C in the direction G (i.e., the arrangements are symmetrical to those illustrated in FIG. 3 to FIG. 5 with respect to a line passing the position C and the axis $A_2$).

Next, referring to FIG. 6 to FIG. 8, a first stopper 40 according to another embodiment will be described. The robot 10 may include the first stopper 40 illustrated in FIG. 6, instead of the aforementioned first stoppers 20A, 20B, and 20C.

The first stopper 40 includes a total of three stopper segments 42, 44, and 46 arranged to align in the direction of the axis D. The adjacent two stopper segments 42 and 44, and 44 and 46 are detachably coupled to each other e.g. by a fastener such as a bolt or by a snap fit.

The stopper segment 42 is detachably attached to the side surface 16a of the lower arm 16 at the position C on the side surface 16a e.g. by a fastener such as a bolt, or by a snap fit, whereby the first stopper 40 is fixed immovably relative to the lower arm 16.

In this embodiment, the stopper segments 42, 44, and 46 have the same shape. Specifically, each of the stopper segments 42, 44, and 46 has the same cross-section as the aforementioned first stopper 20A, and extends in an arc-like fashion along the axis D so as to have a longitudinal direction in the direction of the axis D.

Figure 6:
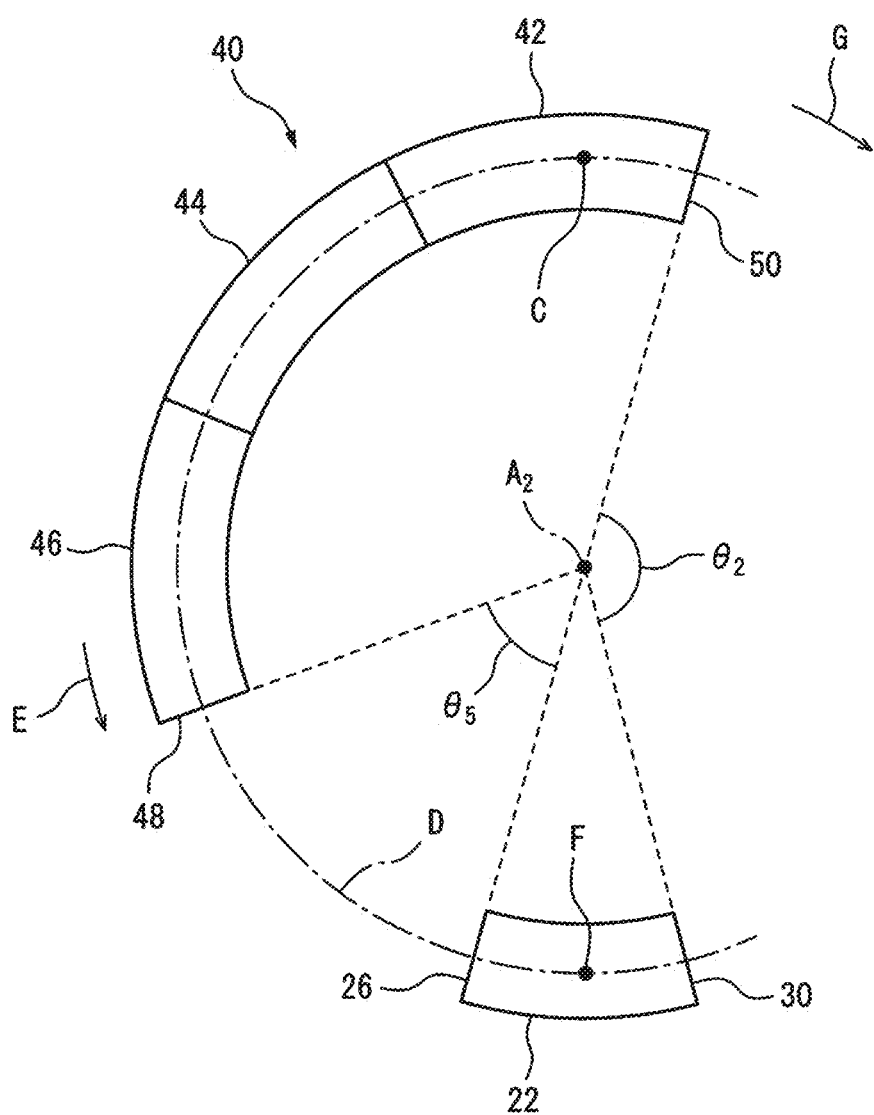
FIG. 6 is a diagram equivalent to FIG. 3, illustrating a positional relationship between a first stopper according to another embodiment, and a second stopper.

When the three stopper segments 42, 44, and 46 are coupled with each other as illustrated in FIG. 6, the first stopper 40 is configured to extend from the position C to an end face 48 of the stopper segment 46 in the direction of the axis 11) toward the second stopper 22.

When the lower arm 16 is rotated relative to the rotating body 14 in the direction E from the position illustrated in FIG. 6, the first stopper 40 provided at the lower arm 16 is also rotated along the axis D in the direction E, together with the rotation of the lower arm 16.

When the lower arm 16 rotates relative to the rotating body 14 in the direction E by an angle $\theta_5$ in FIG. 6, the end face 48 of the stopper segment 46 contacts the end face 26 of the second stopper 22 provided at the rotating body 14. Consequently, the further rotational movement of the lower arm 16 in the direction E is restricted.

On the other hand, when the lower arm 16 rotates relative to the rotating body 14 in the direction G from the position illustrated in FIG. 6 by the angle $\theta_2$, an end face 50 of the stopper segment 42 contacts the end face 30 of the second stopper 22. Consequently, the further rotational movement of the lower arm 16 relative to the rotating body 14 in the direction G is restricted.

In this manner, by the first stopper 40 and the second stopper 22 illustrated in FIG. 6, the movement range of the lower arm 16 relative to the rotating body 14 is limited within a range of the angle $\theta_5$ in the direction E and the angle $\theta_2$ in the direction G with reference to the position in FIG. 6.

Figure 7:
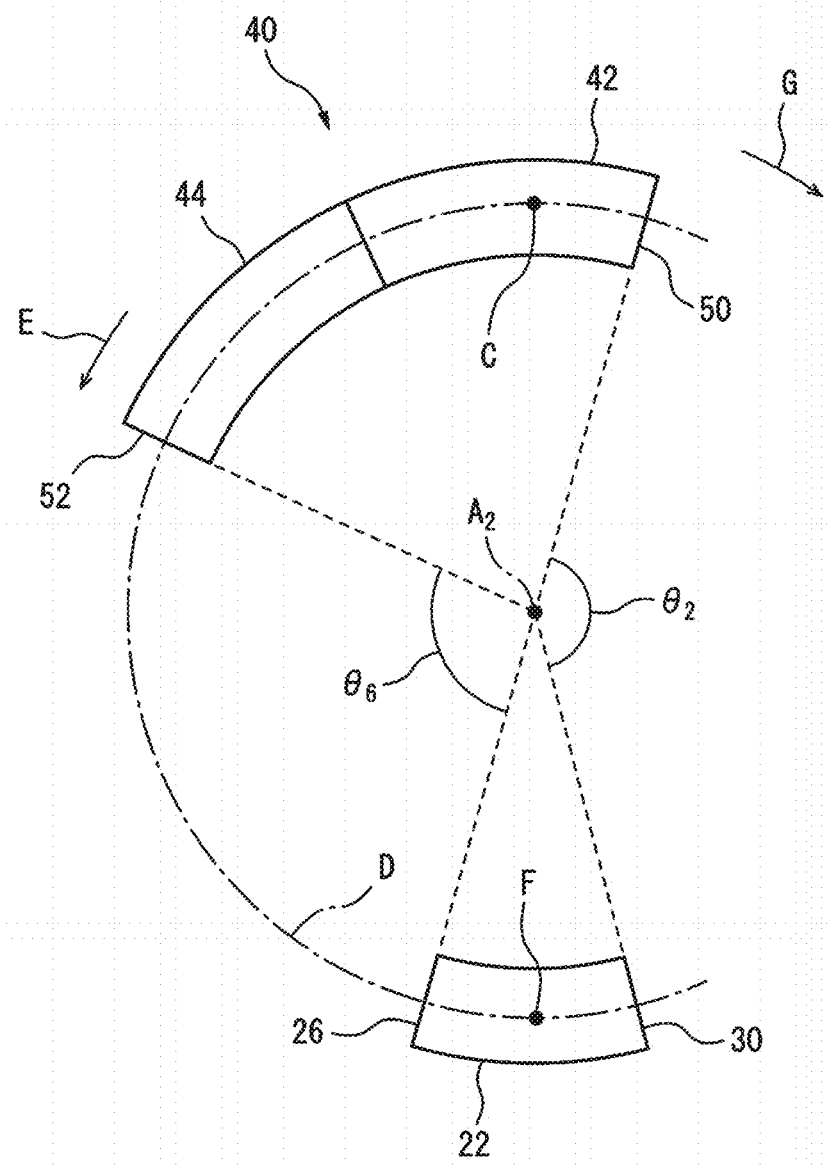
FIG. 7 illustrates a state in which one stopper segment is removed from the first stopper illustrated in FIG. 6.

FIG. 7 illustrates a state in which the stopper segment 46 is removed from the first stopper 40 shown in FIG. 6. The first stopper 40 illustrated in FIG. 7 is constituted by the two stopper segments 42 and 44 arranged to align in the direction of the axis D, and extends from the position C to an end face 52 of the stopper segment 44 along the axis D.

When the lower arm 16 is rotated relative to the rotating body 14 from the position illustrated in FIG. 7 in the direction E in the state where the stopper segment 46 is removed as in FIG. 7, the first stopper 40 illustrated in FIG. 7 is rotated along the axis D in the direction E.

When the lower arm 16 rotates relative to the rotating body 14 in the direction E by an angle $\theta_6(>\theta_5)$ in FIG. 7, the end face 52 of the stopper segment 44 contacts the end face 26 of the second stopper 22. Consequently, the further rotational movement of the lower arm 16 relative to the rotating body 14 in the direction E is restricted.

In this manner, by the first stopper 40 and the second stopper 22 illustrated in FIG. 7, the movement range of the lower arm 16 relative to the rotating body 14 is limited within a range of the angle $\theta_6$ in the direction E and the angle $\theta_2$ in the direction G with reference to the position in FIG. 7.

Figure 8:
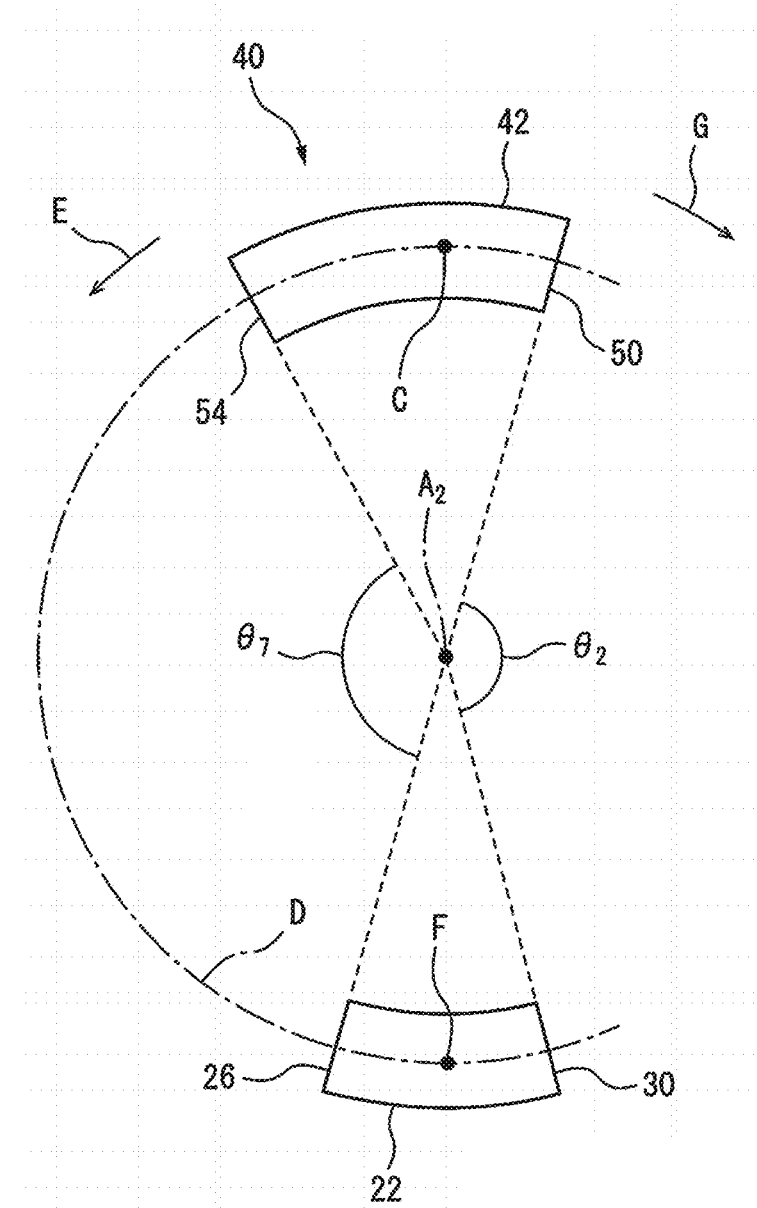
FIG. 8 illustrates a state in which one stopper segment is removed from the first stopper illustrated in FIG. 7.

FIG. 8 illustrates a state in which the stopper segment 44 is removed from the first stopper 40 illustrated in FIG. 7. The first stopper 40 illustrated in FIG. 8 is constituted by the stopper segment 42, and extends from the position C to an end face 54 of the stopper segment 42 along the axis D.

When the lower arm 16 is rotated relative to the rotating body 14 from the position illustrated in FIG. 8 in the direction E in the state where the stopper segments 44 and 46 are removed as in FIG. 8, the first stopper 40 illustrated in FIG. 8 (i.e., the stopper segment 42) is rotated along the axis D in the direction E.

When the lower arm 16 rotates relative to the rotating body 14 in the direction E by an angle $\theta_7(>\theta_6)$ in FIG. 8, the end face 54 of the stopper segment 42 contacts the end face 26 of the second stopper 22. Consequently, the further rotational movement of the lower arm 16 relative to the rotating body 14 in the direction E is restricted.

In this manner, by the first stopper 40 (i.e., the stopper segment 42) and the second stopper 22 illustrated in FIG. 8, the movement range of the lower arm 16 relative to the rotating body 14 is limited within a range of the angle $\theta_7$ in the direction E and the angle $\theta_2$ in the direction G with reference to the position in FIG. 8.

In this embodiment, the first stopper 40 includes a plurality of the stopper segments 42, 44, and 46. According to this configuration, the user can change the length of the first stopper 40 in the direction of the axis D in three levels, by attaching/detaching the stopper segments 42 and 44. Thus, the user can easily change the movement range of the lower arm 16 relative to the rotating body 14 in three levels depending on an application.

In addition, since the first stopper 40 is configured to extend along the axis D, the movement range of the lower arm 16 can be set as desired by a single first stopper 40 even when it is difficult to allow a space for arranging a plurality of stoppers.

Note that, the first stopper 40 may be replaced with the second stopper 22. Specifically, the first stopper 40 may be attached to the side surface 14a of the rotating body 14 at the position F on the side surface 14a, while the second stopper 22 may be attached to the side surface 16a of the lower arm 16 at the position C on the side surface 16a.

Furthermore, the first stopper 40 may be provided so as to extend from the position C in the direction G (i.e., the arrangements are symmetrical to those illustrated in FIG. 6 to FIG. 8 with respect to the line passing the position C and the axis $A_2$).

There are various structures for detachably coupling the stopper segments to each other. Below, referring to FIG. 9 to FIG. 11, examples of coupling structures for the stopper segments will be described below.

Figure 9:
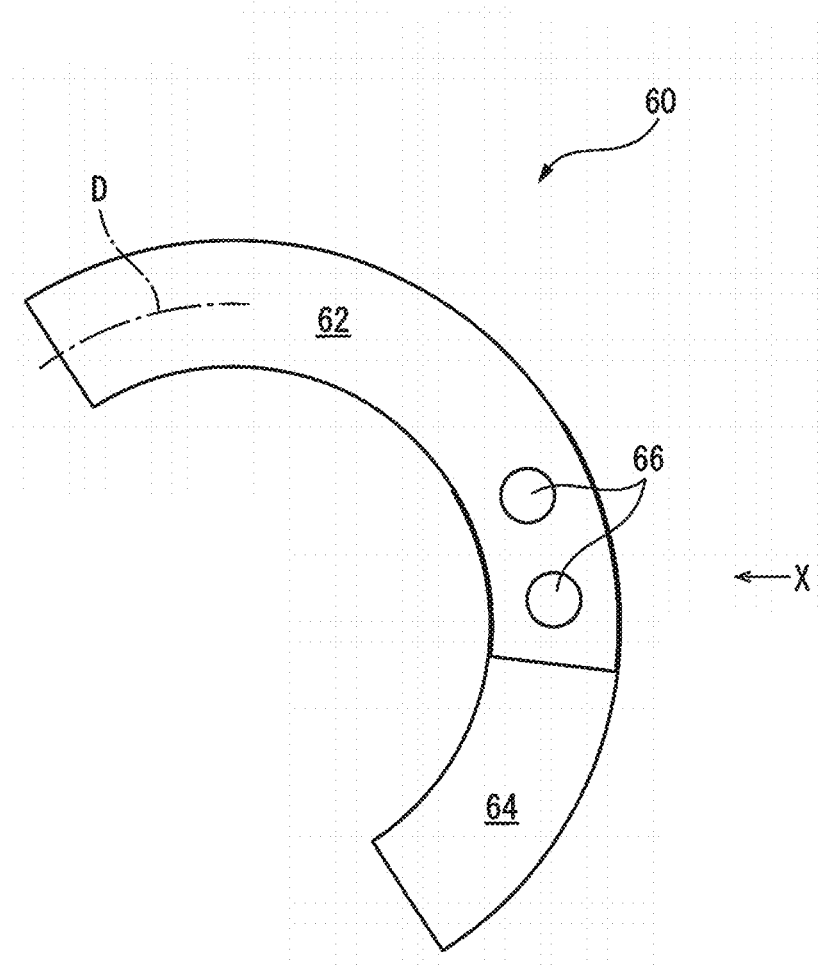
FIG. 9 is a diagram illustrating a first stopper according to still another embodiment.
Figure 10:
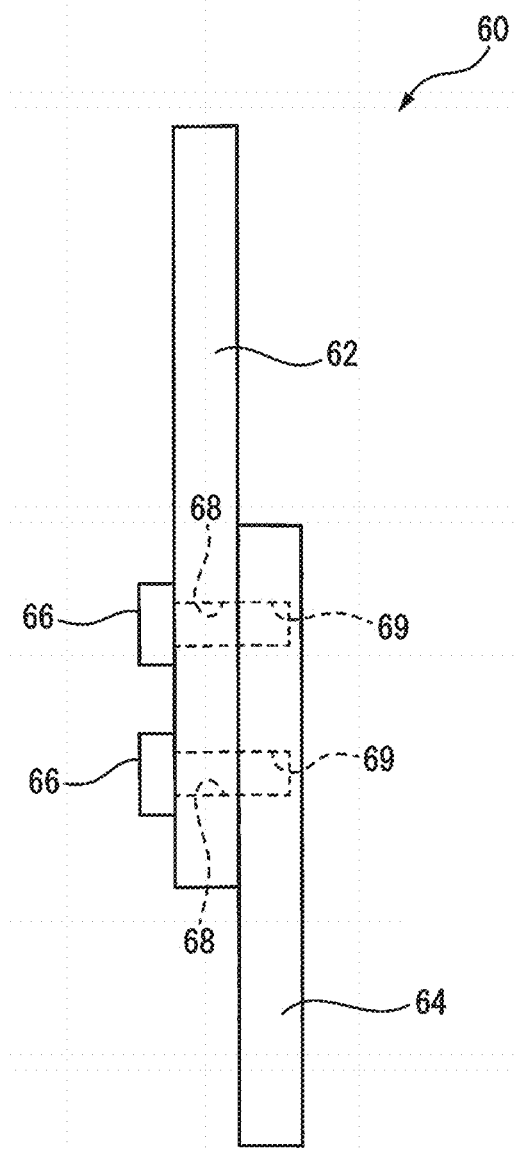
FIG. 10 is a diagram of the first stopper illustrated in FIG. 9, as viewed in a direction of an arrow X in FIG. 9.

A first stopper 60 illustrated in FIG. 9 and FIG. 10 includes stopper segments 62 and 64 aligning in the direction of the axis D, wherein the stopper segments 62 and 64 are detachably coupled to each other by bolts 66. More specifically, a pair of holes 68 are formed in the stopper segment 62, while a pair of tapped holes 69 are formed in the stopper segment 64 at positions corresponding to those of the pair of holes 68.

In a state in which the stopper segment 62 is disposed on the stopper segment 64 such that the pair of holes 68 respectively communicate with the pair of tapped holes 69, two bolts 66 are inserted into the respective holes 68, and fastened to the respective tapped holes 69. In this manner, the stopper segments 62 and 64 may be detachably coupled.

Figure 11:
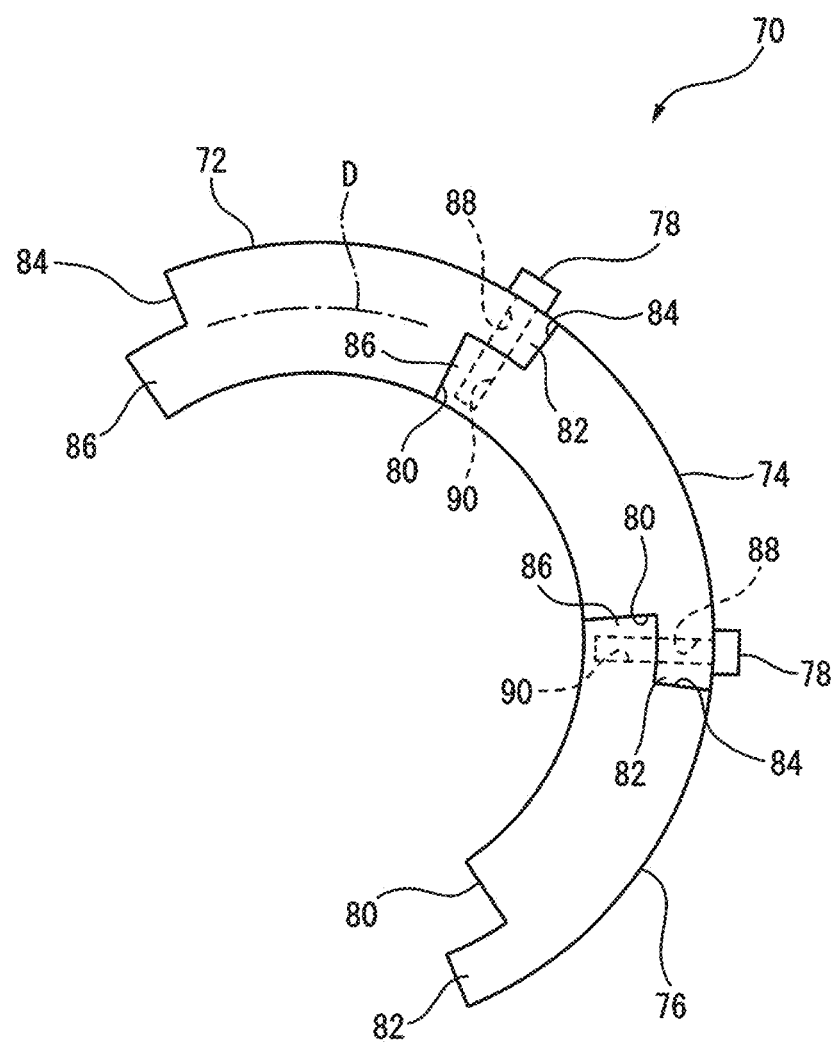
FIG. 11 is a diagram illustrating a first stopper according to still another embodiment.

On the other hand, a first stopper 70 illustrated in FIG. 11 includes stopper segments 72, 74, and 76 aligning in the direction of the axis D, wherein the stopper segments 72, 74, and 76 are detachably coupled to each other by bolts 78. The stopper segments 72, 74, and 76 have the same shape.

Specifically, each of the stopper segments 72, 74, and 76 includes a protrusion 82 protruding along the axis D from one end face 80 in the direction of the axis D, and a protrusion 86 protruding along the axis D from the other end face 84 in the direction of the axis D. The protrusion 82 of each of the stopper segments 72 and 74 is formed with a hole 88, while the protrusion 86 of each of the stopper segments 74 and 76 is formed with a tapped hole 90.

When the stopper segments 72 and 74 are coupled, the protrusion 82 of the stopper segment 72 and the protrusion 86 of the stopper segment 74 are fitted together, such that the hole 88 in the protrusion 82 communicates with the tapped hole 90 in the protrusion 86. In this state, the bolt 78 is inserted into the hole 88 and fastened to the tapped hole 90. In this manner, the stopper segments 72 and 74 are detachably coupled.

Similarly, when the stopper segments 72 and 74 are coupled, the protrusion 82 of the stopper segment 74 and the protrusion 86 of the stopper segment 76 are fitted together, then, the bolt 78 is inserted into the hole 88 of the protrusion 82 and fastened to the tapped hole 90 of the protrusion 86. In this manner, the stopper segments 74 and 76 are detachably coupled.

Note that, the first stopper may be configured such that the length thereof in the direction of the axis D is variable. Below, referring to FIG. 12 and FIG. 13, a first stopper 100, the length in the direction of the axis D of which is variable, will be described below.

The first stopper 100 includes a fixed member 102, a movable member 104, and a locking mechanism 106. The fixed member 102 is an arc-shaped member extending along the axis D, and fixed to the side surface 16a of the lower arm 16 at the position C on the side surface 16a, e.g. by a fastener such as a bolt or by a snap fit.

Figure 13:
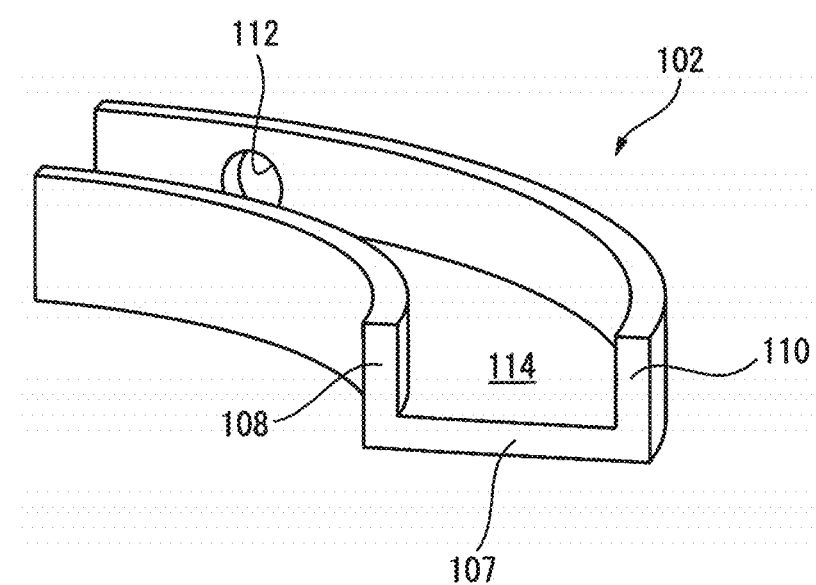
FIG. 13 is a diagram illustrating a fixed member illustrated in FIG. 12.

As illustrated in FIG. 13, the fixed member 102 includes a bottom wall 107 and a pair of side walls 108 and 110 extending from both end edges of the bottom wall 107 so as to be opposite to each other. A tapped hole 112 is formed in the side wall 110. The bottom wall 107 and the pair of side walls 108 and 110 define a groove 114 extending in the direction of the axis D.

The movable member 104 is an arc-shaped member extending along the axis D, and received in the groove 114 of the fixed member 102 so as to be slidable in the direction of the axis D. In this embodiment, the locking mechanism 106 is a fastening tool such as a bolt, and threadedly engages the tapped hole 112.

Figure 12:
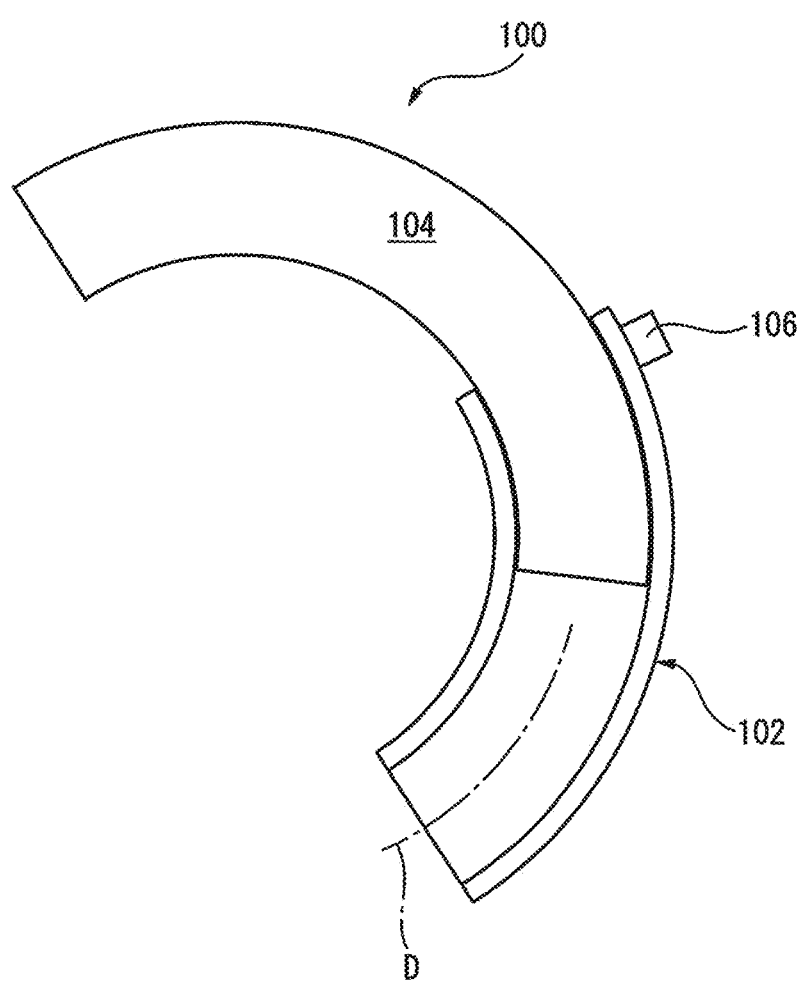
FIG. 12 is a diagram illustrating a first stopper according to still another embodiment.

Referring to FIG. 12, when changing the length of the first stopper 100 in the direction of the axis D, a user slides the movable member 104 in the groove 114 in a state where the locking mechanism 106 is removed from the tapped hole 112 (or loosened), and disposes the movable member 104 at a desired position relative to the fixed member 102.

Then, the user screws the locking mechanism 106 into the tapped hole 112 so as to press the tip of the locking mechanism 106 onto the movable member 104. Consequently, the movement of the movable member 104 relative to the fixed member 102 is restricted, and whereby, the movable member 104 is fixed at a desired position relative to the fixed member 102.

In this way, according to this embodiment, since the user can arbitrarily change the length of the first stopper 100 in the direction of the axis D, it is possible to limit the movement range of the lower arm 16 relative to the rotating body 14 as desired, without arranging a plurality of physical stoppers along the axis D.

Figure 14:
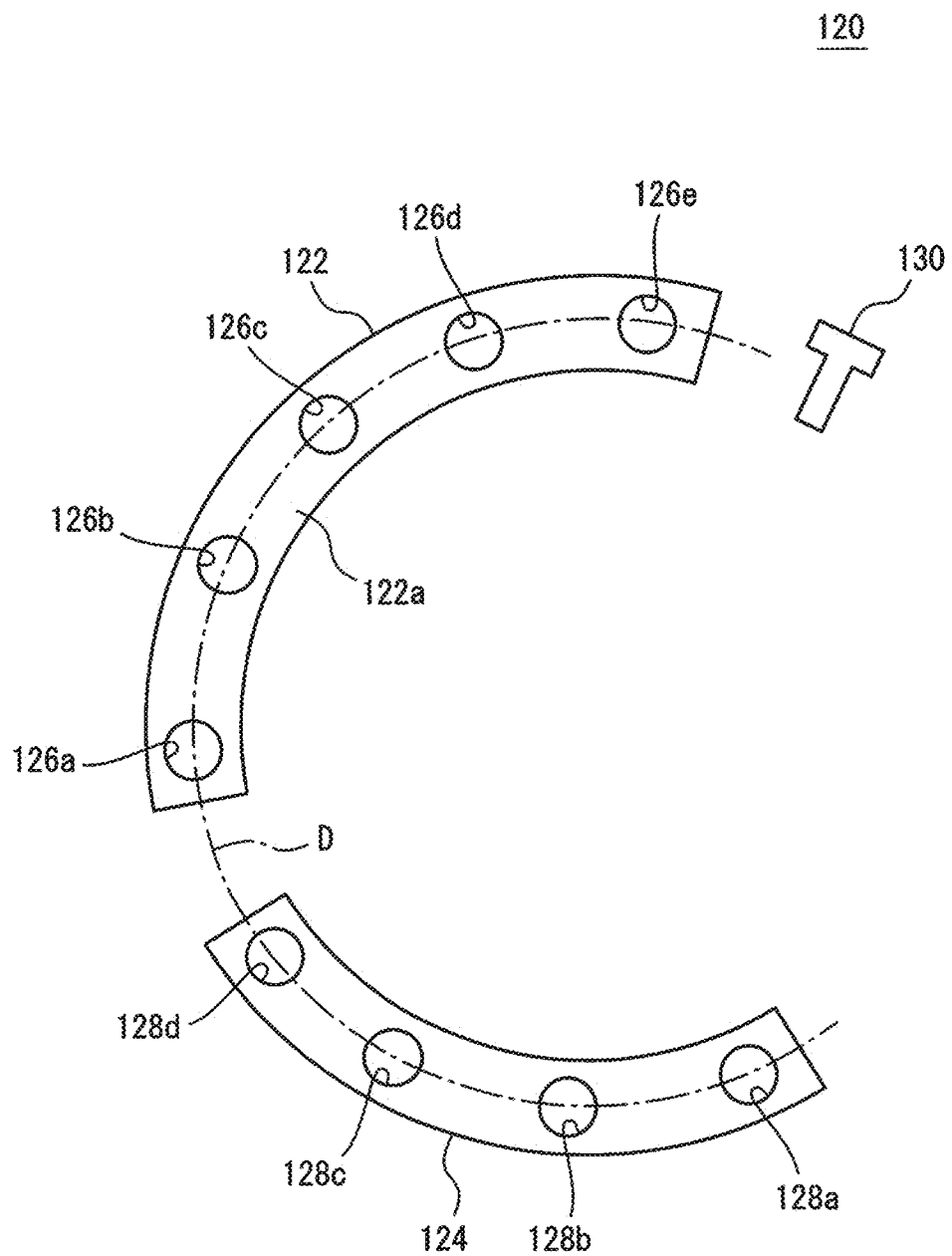
FIG. 14 is an exploded view of a first stopper according to still another embodiment.

Next, referring to FIG. 14 to FIG. 16, a first stopper 120 according to another embodiment, which has a variable length in the direction of the axis D, will be described. The first stopper 120 includes a fixed member 122, a movable member 124, and a locking mechanism 130. Each of the fixed member 122 and the movable member 124 is an arc-shaped flat plate member extending along the axis D.

The fixed member 122 is formed with a total of five tapped holes 126a, 126b, 126c, 126d, and 126e arranged in the direction of the axis D at substantially regular intervals. The fixed member 122 is fixed to the side surface 16a of the lower arm 16 at the position C on the side surface 16a, e.g. by a fastener such as a bolt or by a snap fit. As an example, the fixed member 122 is fixed at the position C by locating the tapped hole 126a at the position C and fastening a bolt to the tapped hole 126a.

On the other hand, the movable member 124 is formed with a total of four tapped holes 128a, 128b, 128c, and 128d arranged in the direction of the axis D at the same intervals as the tapped holes 126a, 126b, 126c, 126d, and 126e of the fixed member 122. The movable member 124 is slidably disposed on a surface 122a of the fixed member 122. The locking mechanism 130 is a fastening tool such as a bolt, similarly to the aforementioned locking mechanism 106.

Figure 15:
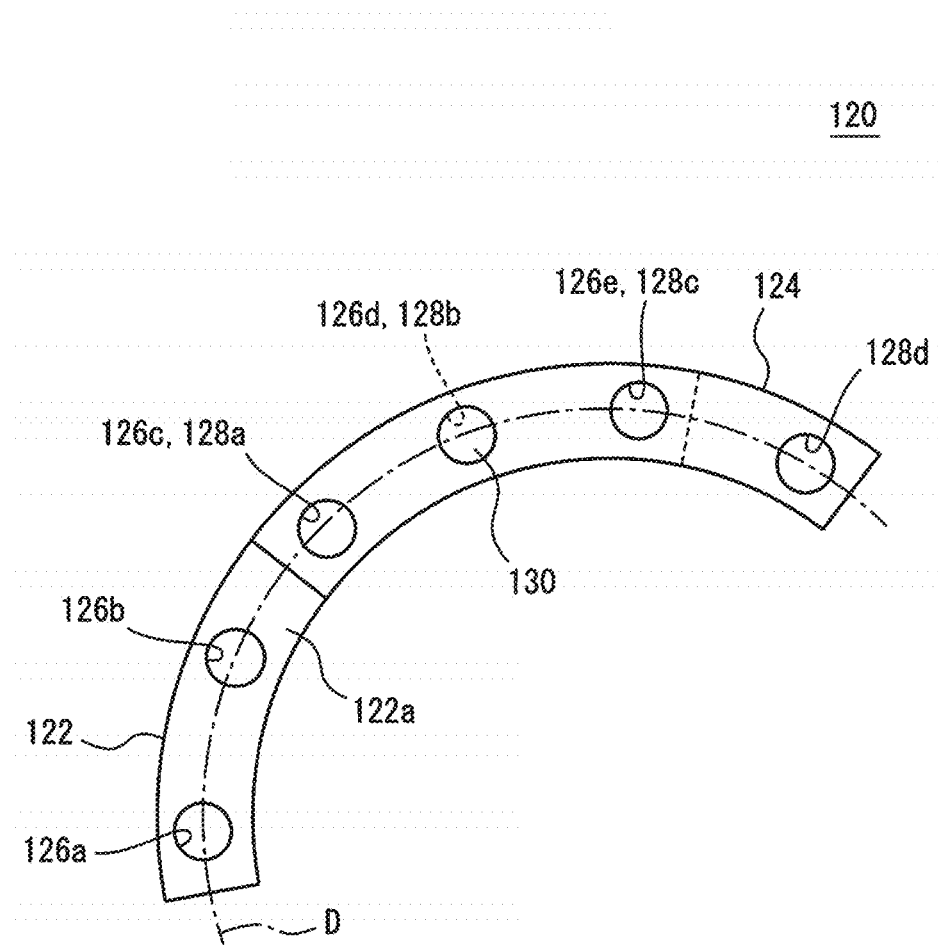
FIG. 15 is an assembly diagram of the first stopper illustrated in FIG. 14.

When changing the length of the first stopper 120 in the direction of the axis D, the user disposes the movable member 124 on the surface 122a of the fixed member 122 as illustrated in in FIG. 15, for example. In the state illustrated in FIG. 15, the tapped holes 126c, 126d, and 126e of the fixed member 122 respectively communicate with the tapped holes 128a, 128b, and 128c of the movable member 124.

In this state, the user screws the locking mechanism 130 into the tapped holes 126c and 128a, the tapped holes 126d and 128b, or the tapped holes 126e and 128c, which are in communication with each other.

In the example illustrated in FIG. 15, the locking mechanism 130 is fastened to the tapped holes 126d and 128b. In this manner, the movement of the movable member 124 relative to the fixed member 122 is restricted by the locking mechanism 130, and whereby the movable member 124 is fixed relative to the fixed member 122.

Figure 16:
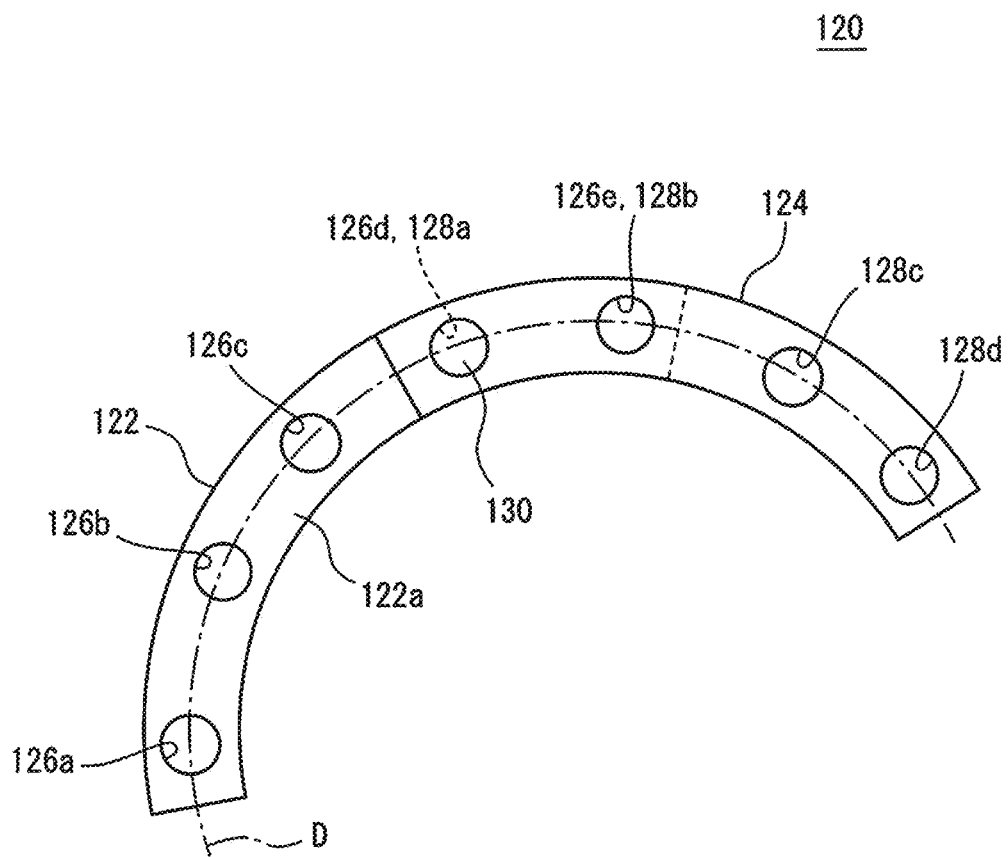
FIG. 16 is an assembly diagram of the first stopper illustrated in FIG. 14.

Then, the user disposes the movable member 124 on the surface 122a of the fixed member 122 as illustrated in FIG. 16. In the state illustrated in FIG. 16, the tapped holes 126d and 126e of the fixed member 122 respectively communicate with the tapped holes 128a and 128b of the movable member 124.

In this state, the user screws the locking mechanism 130 into the tapped holes 126d and 128a, or the tapped holes 126e and 128b, which are in communication with each other. In the example illustrated in FIG. 16, the locking mechanism 130 is fastened to the tapped holes 126d and 128a. In this manner, the movement of the movable member 124 relative to the fixed member 122 is restricted by the locking mechanism 130, and whereby the movable member 124 is fixed relative to the fixed member 122.

According to this embodiment, the user can change the length of the first stopper 120 in the direction of the axis D as desired, by arbitrarily aligning the tapped holes 126a-126e of the fixed member 122 with the tapped holes 128a-128d of the movable member 124 and fastening the aligned holes with the locking mechanism 130. In this manner, it is possible to limit the movement range of the lower arm 16 relative to the rotating body 14 as desired, without arranging a plurality of physical stoppers along the axis D.

Note that, the movable member 124 may be fixed to the fixed member 122 with a plurality of the locking mechanisms 130. In addition, the aforementioned first stopper 60, 70, 100, or 120 may be attached at the position F on the side surface 14a of the rotating body 14, instead of the position C on the side surface 16a of the lower arm 16.

Furthermore, the cross-sections of the first stoppers 20A to 20C, 40, 60, 70, 100 and 120, and of the second stopper 22 may each be any shape (an n-sided polygonal shape, a circular shape, an elliptical shape, or the like).

Furthermore, the second stopper 22 may be fixed integrally with the side surface 14a of the rotating body 14 at the position F. The second stopper 22 may not extend along the axis D, but may have any shape, such as a quadrangular prism, as long as it can contact the first stopper 20A to 20C, 40, 60, 70, 100, or 120. The structure of the aforementioned first stopper 20A to 205, 40, 60, 70, 100, or 120 may be applied to the second stopper 22.

Furthermore, in the aforementioned embodiments, the first stopper 20A to 20C, 40, 60, 70, 100, or 120 and the second stopper 22 are provided to limit the movement range of the lower arm 16 relative to the rotating body 14, as an example.

However, the first stopper 20A to 205, 40, 60, 70, 100, or 120 and the second stopper 22 may be provided to limit a movement range of the rotating body 14 relative to the base 12, or a movement range of the upper arm 18 relative to the lower arm 16.

Figure 17:
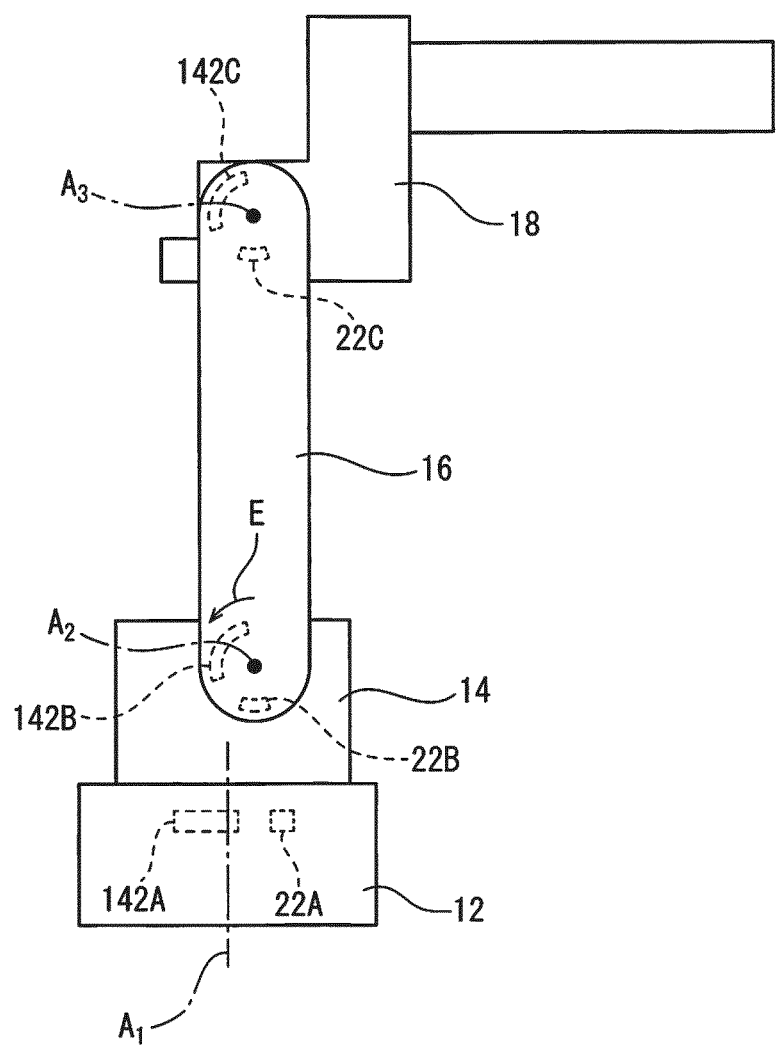
FIG. 17 is a diagram of a robot according to another embodiment.

Such an embodiment is illustrated in FIG. 17. A robot 140 illustrated in FIG. 17 includes the base 12, the rotating body 14, the lower arm 16, the upper arm 18, first stoppers 142A, 142B, and 1425, and second stoppers 22A, 22B, and 225.

The first stopper 142A is provided on a side surface (not illustrated) of the rotating body 14 which faces the base 12, while the second stopper 22A is provided on a side surface (not illustrated) of the base 12 which faces the rotating body 14.

When the rotating body 14 rotates relative to the base 12 about the axis $A_1$, the first stopper 142A provided at the rotating body 14 contacts the second stopper 22A provided at the base 12, as a result of which, the rotational movement of the rotating body 14 relative to the base 12 is restricted. In this manner, the movement range of the rotating body 14 relative to the base 12 is limited by the first stopper 142A and the second stopper 22A.

The first stopper 142B is provided on the side surface 16a (FIG. 2) of the lower arm 16, while the second stopper 22B is provided on the side surface 14a (FIG. 2) of the rotating body 14. The first stopper 142B and the second stopper 22B limit the movement range of the lower arm 16 relative to the rotating body 14, as in the aforementioned embodiments.

The first stopper 1425 is provided on a side surface (not illustrated) of the upper arm 18 which faces the lower arm 16, while the second stopper 225 is provided on the side surface 16a (FIG. 2) of the lower arm 16 which faces the upper arm 18.

When the upper arm 18 rotates relative to the lower arm 16 about the axis $A_3$, the first stopper 142C provided at the upper arm 18 contacts the second stopper 225 provided at the lower arm 16, as a result of which, the rotational movement of the upper arm 18 relative to the lower arm 16 is restricted. In this manner, the movement range of the upper arm 18 relative to the lower arm 16 is limited by the first stopper 1425 and the second stopper 225.

It would be understood that the aforementioned first stopper 20A to 205, 40, 60, 70, 100, or 120 is applicable to the first stoppers 142A, 142B, and 1425 of this embodiment, while the aforementioned second stopper 22 is applicable to the second stoppers 22A, 22B, and 225.

Note that, the concept of the first stopper and the second stopper according to the present disclosure can be applied to application for limiting a movement range of a second component that linearly moves relative to a first component. Such an embodiment is illustrated in FIG. 18.

Figure 18:
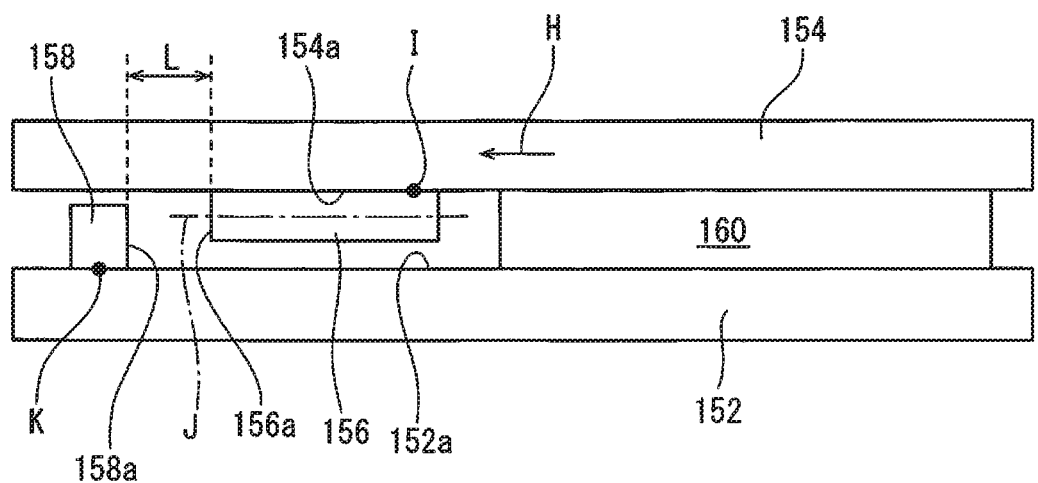
FIG. 18 is a diagram of a robot according to still another embodiment.

A robot 150 illustrated in FIG. 18 includes a first arm 152, a second arm 154, a first stopper 156, and a second stopper 158. The second arm 154 is coupled to the first arm 152 via a coupling mechanism 160 so as to be linearly movable in a direction H.

The first stopper 156 is detachably attached to the side surface 154a of the second arm 154 which faces the first arm 152 at a position I on the side surface 154a. The first stopper 156 extends from the position I toward the second stopper 158 along an axis J parallel to the direction H. The axis J is a straight line. The first stopper 156 has a longitudinal direction in the direction of the axis J.

On the other hand, the second stopper 158 is detachably fixed to a side surface 152a of the first arm 152 which faces the second arm 154 at a position K on the side surface 152a.

When the second arm 154 moves in the direction H relative to the first arm 152 from the position illustrated in FIG. 18 by a distance L, an end face 156a of the first stopper 156 contacts an end face 158a of the second stopper 158. Due to this, the further movement of the second arm 154 relative to the first arm 152 in the direction H is restricted, whereby the movement range of the second arm 154 relative to the first arm 152 can be limited.

It would be understood that, by applying the concept of the aforementioned first stopper 20A to 20C, 40, 60, 70, 100, or 120 to the first stopper 156, the movement, range of the second arm 154 relative to the first arm 152 (i.e., the distance L) can be changed.

Note that, the robot 10, 140, or 150 is not limited to a vertical articulated robot, but may be any type of robot, such as a parallel link robot or a horizontal articulated robot, which includes a first component and a second component movably coupled with the first component.

Although the disclosure has been described above through the embodiments, the aforementioned embodiments are not intended to limit the invention according to the claims.

The invention claimed is:

1. A robot, comprising:
   a first component;
   a second component movably coupled to the first component;
   a first stopper provided at one of the first component and the second component, and extending along a rotational axis parallel to a rotational movement direction of the second component relative to the first component, the first stopper being configured such that a length thereof in a direction of the axis from a first end of the first stopper in the direction of the axis to a second end of the first stopper opposite the first end is variable; and
   a second stopper provided at the other of the first component and the second component, and configured to contact the first end or the second end of the first stopper so as to limit a movement range of the second component relative to the first component when the second component moves relative to the first component, wherein
   the first stopper comprises:
      a fixed member fixedly provided at the one of the first component and the second component, and defining the first end;
      a movable member attached to the fixed member so as to be slidable in a rotational direction of the rotational axis, and defining the second end; and
      a locking mechanism configured to lock the movable member to the fixed member so as to restrict movement of the movable member relative to the fixed member, the locking mechanism being configured to lock the movable member with respect to the fixed member at a plurality of positions such that the length of the first stopper is variable, wherein
   the moveable member is configured to move to change the length of the first stopper.

2. The robot according to claim 1, wherein the second stopper extends along the axis.

3. The robot according to claim 1, wherein the second component is rotatably coupled to the first component.

* * * * *